Patented July 1, 1952

2,602,088

UNITED STATES PATENT OFFICE 2,602,088

ACIDIC POLYCARBOXY ESTERS OF CERTAIN OXYPROPYLATED DERIVATIVES OF STYRENE GLYCOLS AND POLYSTYRENE GLYCOLS

Melvin De Groote, University City, Mo., assignor to Petrolite Corporation, Ltd., Wilmington, Del., a corporation of Delaware No Drawing. Application May 3, 1950,
Serial No. 159,862

10 Claims. (Cl. 260—475)

The present invention is concerned with certain new chemical products, compounds or compositions which have useful application in various arts. It includes methods or procedures for manufacturing said new chemical products, compounds or compositions, as well as the products, compounds, or compositions themselves.

More specifically, the present invention is concerned with certain acidic polycarboxy esters, particularly dicarboxy esters of oxypropylation derivatives obtained from styrene glycol and low molal polystyrene glycols, i. e., styrene glycol to and including an average of the hexamer.

In a more detailed aspect the present invention is concerned with a monomeric acidic fractional ester; said acidic fractional ester being obtained by reaction between (a) one mole of the dihydroxylated oxypropylation product obtained from a member of the class consisting of styrene glycols and polystyrene glycols up to and including the hexamer, and (b) 2 moles of a polycarboxy acid; said oxypropylation product prior to esterification being within the molecular weight range of 750 to 3500 and being obtained by oxypropylation in the molal ratio from 10 to 1 through the range of 50 to 1 on the basis of propylene oxide to styrene compound, and said oxypropylation product prior to esterification being water-insoluble; said acidic reactant having not more than 36 carbon atoms.

Products as above described briefly, and hereinafter described in detail, are particularly effective in breaking petroleum emulsions of the water-in-oil type. Oil field emulsions of this type are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application or use of my mixtures, reagents, or compounds, is described and claimed in my co-pending application, Serial No. 159,861, filed May 3, 1950.

The compounds or cogeneric mixtures herein described are not only useful for breaking oil field emulsions but are also useful for various other purposes, such as a break-inducer in the doctor treatment of sour hydrocarbons, as an emulsifying agent, as a component in the preparation of micellar solutions, as an additive to nonhydrocarbon lubricants, as an intermediate for further reaction by virtue of the terminal carboxyl radicals, etc.

For purpose of convenience, what is said hereinafter will be divided into three parts.

Part 1 is concerned with a description of styrene glycol and the low molal polystyrene glycols;

Part 2 is concerned with the oxypropylation of the aforementioned styrene glycol; and Part 3 is concerned with the conversion of the oxypropylated derivatives into fractional acid esters by reaction with polycarboxy acids and particularly dicarboxy acids.

PART 1

Styrene glycol can be obtained in various manners as described in the literature. One procedure is to react styrene oxide with water. Polystyrene glycols can be obtained by various methods. For instance, the conventional method involving etherization between two or molecules of styrene glycol, can be used. Another procedure most frequently employed is simply to treat styrene glycol with one to five moles of styrene oxide.

Styrene oxide, sometimes referred to as phenyl ethylene oxide, or styrene epoxide, reacts in the same manner as other alpha-beta alkylene oxide reactants. This is illustrated by comparison between the reactivity of styrene oxide in comparison with other oxides toward phenols. See U. S. Patent No. 2,422,637, dated June 17, 1947, to Thomas.

Reactions involving alpha-beta alkylene oxide become more complicated when one is concerned with a substituted alkylene oxide as, for example, styrene, propylene oxide, or the like. The mechanism of this reaction, i. e., reaction involving the opening of the epoxy ring, has been subjected to considerable examination and exploration but is still somewhat obscure. See J. A. C. S., vol. 72, No. 3, pp. 1251–53, March 1950; J. Soc. Chem. Ind. (London), vol. 68, pp. 179–83, June 1949; and J. A. C. S., vol. 68, p. 680 (1946); and Chemical and Engineering News, vol. 27, No. 16, page 1136. This refers to a paper presented by Guss on styrene oxide reactions at the April 1949, meeting of the American Chemical Society. It may have appeared in the literature subsequently.

In light of what will be said subsequently it becomes obvious that one actually does not obtain a single compound but does obtain a cogeneric mixture at the various stages of manufacture. This is particularly true in the oxypropylation stage but also applies to the oxy-(phenyl)ethylation. This can be illustrated by consideration of distyrene glycol. The method of obtaining this product has been noted previously. It can be obtained by the etherization of two moles of styrene glycol or the treatment of one mole of styrene glycol with one mole of styrene oxide. For sake of simplicity the reaction involving 2 moles of styrene glycol is shown thus:

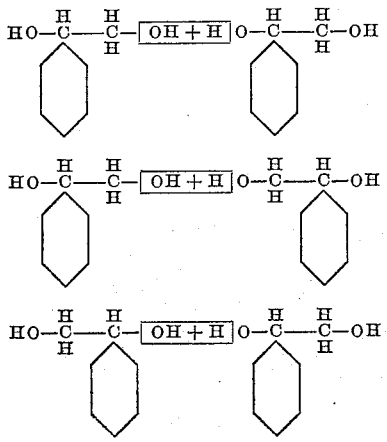

The styrene glycol, like propylene glycol, includes one primary alcoholic group and one secondary alcoholic group. Thus at this first stage of polymerization three diglycols, are possibly as illustrated above. It becomes obvious that more complicated structures and more isomers appear at the higher stage of oxy(phenyl)ethylation.

Oxy(phenyl)ethylation is employed under the same conditions as other conventional alpha-beta oxides, i. e., in presence of acid catalysts, in presence of basic catalysts, and in absence of any catalysts. The acid catalysts employed may be illustrated by mineral acids including sulfuric acid, organic acid such as sulfonic acids, aluminum chloride, zinc chloride, stannic or stannous chloride, ferric chloride, etc. Some clays have been used which have acid characteristics. The alkaline catalysts include caustic soda, caustic potash, sodium methylate, etc. The particular direction taken by the reaction, whether propylene oxide or styrene oxide, is controlled or determined in part, at least, by the catalyst employed. All this has been examined and discussed in the literature references above. For my particular purpose it is immaterial whether the dimeric, trimeric, tetrameric, pentameric, or hexameric polystyrene glycol is obtained by any particular catalyst or in absence of a catalyst. In fact, monomeric styrene glycol as differentiated from the low stage polymers is a very satisfactory initial reactant. Styrene glycol is a very water-soluble but substantially insoluble in benzene. As polymerization increases solubility in water decreases and solubility in hydrocarbon solvents increases. Styrene glycol is a solid whereas the higher polymers become liquid.

I have limited the polystyrene glycols herein employed as initial reactants to the hexameric stage. Needless to say, the co-generic mixture obtained by treating one mole of styrene glycol with 5 moles of styrene oxide will not necessarily be limited to the hexamer but will contain some lower polymers and some higher polymers but on the average will represent the hexamer. This point is discussed subsequently in connection with the use of propylene oxide where the same situation is involved.

It is to be noted that if a polystyrene glycol is prepared using an alkaline catalyst that the alkaline catalyst need not be removed prior to oxypropylation for the reason that an alkaline catalyst is particularly satisfactory for this subsequent reaction.

If an acid catalyst is employed in preparing the polystyrene glycol then one has a choice of a number of procedures. One procedure is to leave the acid present and use the acid as a catalyst in oxypropylation but this is generally unsatisfactory for the reason that where there is repetitious oxypropylation an acid catalyst seems to lose its effect or, in any event, be less satisfactory than an alkaline catalyst. The use of an acid catalyst may result in combination with an alkalene oxide to yield products of unpredictable stability. However, if the amount of oxypropylation, as subsequently described, is of a limited nature the acid catalyst may serve but may not represent the most desirable procedure.

The acid-catalyzed reaction product may be freed from acid and an alkali added, or alkali can be added and the material refluxed after dilution with xylene, followed by filtering to remove any sodium chloride, sodium phosphate, or sodium sulfate. Sodium salts of sulfonic acids are not eas readily removable. The formation of polystyrene glycols in absence of a catalyst is a slow reaction but, needless to say, such initial material or primary reactant free from any catalyst is a perfectly satisfactory raw material.

PART 2

The monomeric material can be purchased from the Dow Chemical Company, Midland, Michigan. I have also prepared derivatives of the kind described in Part 1, preceding, on a laboratory scale varying from a few hundred grams or less to somewhat larger amounts. The same applies to the preparation of the oxypropylated compounds with which this second part is concerned.

For a number of well known reasons equipment, whether laboratory size, semi-pilot plant size, pilot plant size, or large scale size, is not as a rule designed for a particular alkylene oxide. Invariably and inevitably, however, and particularly in the case of laboratory equipment, the design is such as to use any of the customarily available alkylene oxides, i. e., ethylene oxide, propylene oxide, butylene oxide, glycide, epichlorohydrin, styrene oxide, etc. Such equipment has been employed in the preparation of the polystyrene glycols referred to elsewhere in the text. In the description of the equipment it becomes obvious that it is adapted for oxyethylation as well as oxypropylation.

Oxypropylations are conducted under a wide variety of conditions, not only in regard to presence or absence of catalyst, kind of catalyst previously described, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 115° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low temperature-low reaction rate oxypropylations have been described very completely in U. S. Patent No. 2,448,664 to H. R. Fife et al., dated September 7, 1948. See also British Patent No. 601,604, to Fife et al., dated May 10, 1948. Low temperature-low pressure oxypropylations are particularly desirable where the compound being subjected to oxypropylation contains one or two points of reaction only, such as one or two hydroxyl radicals.

Since low pressure-low temperature reaction speed oxypropylations require considerable time, for instance, 1 to 7 days of 24 hours each to complete the reaction they are conducted as a rule, whether on a laboratory scale, pilot plant scale, or large scale, so as to operate automatically. The prior figure of seven days applies especially to large scale operations. I have used conventional equipment with two added automatic features; (a) a solenoid controlled valve which shuts off the propylene oxide in event that the temperature gets outside a predetermined and set range, for instance, 110° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, temperature of reaction is higher, speed of reaction is higher, and time of reaction is much shorter. In such instances such automatic controls are not necessarily used.

Thus, in preparing the various examples I have found it particularly advantageous to use laboratory equipment which is designed to permit continuous oxyalkylation whether it be oxypropylation or oxyethylation. With certain changes as will be pointed out hereinafter the equipment can be used also to permit oxyalkylation involving the use of glycide or styrene oxide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately one gallon and a working pressure of one thousand pounds gauge pressure. This pressure obviously is far beyond any requirement as far propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene or ethylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances a larger autoclave was used, i. e., one having a capacity ranging in the neighborhood of 1¾ gallons.

Continuous operation, or substantially continuous operation, was achieved by the use of a separate container to hold the alkylene oxide being employed, particularly propylene oxide. The container consists essentially of a laboratory bomb having a capacity of about one-half gallon, or somewhat in excess thereof. In some instances a larger bomb was used, to wit, one having a capacity of about one gallon, also, with an inlet for charging, and an eductor tube going to the bottom of the container so as to permit discharging of alkylene oxide in the liquid phase to the autoclave. Other conventional equipment consists, of course, of the rupture disc, pressure gauge sight feed glass, thermometer connection for nitrogen for pressuring bomb, etc. The bomb was placed on a scale during use. The connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations became uniform in that the reaction temperature was held within a few degrees of any selected point, for instance, if 115° C. was selected as the operating temperature the maximum point would be at the most 120° C. or 122° C., and the lower point would be 110° or possibly 108° C. Similarly, the pressure was held at approximately 30 pounds within a 5-pound variation one way or the other. The speed of reaction was slow under such conditions. Numerous reactions were conducted in which the time varied from one day (24 hours) up to three days (72 hours). In some instances the reaction may take place in considerably less time, i. e., 24 hours or less. The minimum time recorded was a 24-hour period. Reactions indicated as being complete in 24 hours may have been complete in a lesser period of time in light of the automatic equipment employed. In the addition of propylene oxide, in the autoclave equipment as far as possible the valves were set so all the propylene oxide if fed continuously would be added at a rate so that the predetermined amount would react within the first 15 hours of the 24-hour period. This meant that if the reaction was interrupted automatically for a period of time for pressure to drop or temperature to drop the predetermined amount of oxide would still be added in most instances in a 24-hour period. Sometimes where the addition was a comparatively small amount over a 24-hour period there would be an unquestionable speeding up of the reaction.

When operating at a comparatively high temperature, for instance, between 150° to 200° C., an unreacted alkylene oxide, such as propylene oxide, makes its presence felt in the increase in pressure or the consistency of a high pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counter-balance scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. Incidentally, the ratios in the table are amounts as taken from the scale and the actual amounts of propylene oxide may have varied slightly one way or the other insofar that the scale readings at approximately 1,000 grams may have been off 5 to 10 grams, and at 2,000 grams may have been off 15 to 25 grams. In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gases, check valves and entire equipment. As far as I am aware at least two firms, and possibly three, specialize in autoclave equipment such as I have employed in the laboratory, and are prepared to furnish equipment of this same kind. This point is simply made as a precaution in the direction of safety. Oxyalkylations particularly involving ethylene oxide, glycide, propylene oxide, etc., should not be conducted except in equipment specifically designed for the purpose.

A word can be included in regard to the use of either glycid or styrene oxide. As previously pointed out products subjected to oxypropylation are obtained by the treatment of styrene glycol with styrene oxide. In this instance pressure was not involved and no effort was made to use an automatically controlled long-time reaction period (slow reaction rate.). Indeed, in the use of styrene oxide the entire equipment was used almost as if it were an ordinary piece of non-pressure laboratory equipment, since such reactions can be so conducted. Due to the high boiling point of styrene oxide one can readily employ a typical separable glass resin pot as described in U. S. Patent No. 2,499,365, dated March 7, 1950, to De Groote et al., and offered for sale by numerous laboratory supply houses. This equipment is also described here for the reason that it is used in subsequent operations for adding the catalyst to the styrene glycol or polystyrene glycol, and also because it exemplifies the equipment used on a laboratory scale to prepare the esters described in Part 3. If such arrangement is used to prepare laboratory-scale duplications, then care should be taken that the heating mantle can be removed rapidly, so as to allow for cooling; or better still, through an added opening at the top of the glass resin pot or comparable vessel should be passed a stainless steel cooling coil so that the pot can be cooled more rapidly than by mere removal of mantle. If a stainless steel coil is introduced it means that the conventional stirrer of the paddle type is changed to one of the centrifugal type, which causes the fluid or reactants to mix due to swirling action in the center of the pot. Still better is the use of a metal laboratory autoclave of the kind previously described above; but in any event, when the initial amount of styrene oxide is added to a suitable reactant, the speed of reaction should be controlled by the usual factors, such as (a) the addition of styrene oxide; (b) the elimination of external heat; and (c) use of cooling so there is no undue rise in temperature. All the foregoing is merely conventional but is included due to the hazard in handling styrene oxide.

The amount of catalyst used in oxypropylation may vary from as little as ½% up to 5%. The amount may vary during the oxypropylation period as exemplified by the addition of the catalyst at the very beginning of the reaction only and with no further addition. Needless to say, there is a comparatively high concentration of catalyst at the beginning of the reaction and a comparatively low concentration at the end; in fact, not infrequently the amount of catalyst at the end will be ½ of 1% sodium methylate, or caustic soda, or less. Catalyst can be added intermittently during the reaction period provided that suitable equipment is available. It is rather difficult to employ such equipment on a laboratory scale but it can be employed, of course, on a pilot plant scale or larger scale.

Needless to say, the residual catalyst need not be as low as ½%. It may be as much as 1% or 2%, which means that the catalyst added initially may be several times as much as indicated in the table, for example, in the subsequent table in Example 2 the amount of monomer employed was a little over 200 grams. The amount of catalyst added was 12 grams or 6%. Actually, the amount of catalyst added uould be twice or two-and-a-half times this amount. The result would be, everything else equal, that the final product would simply have more residual catalyst.

The products subjected to oxypropylation were styrene glycol, dimeric styrene glycol, trimeric styrene glycol, and tetrameric styrene glycol, the pentamer or hexamer. These materials were prepared in the manner previously described and were either neutral or alkaline, due to the presence of a residual catalyst. When reference is made to the addition of sodium methylate this reference to the total amount present, i. e., that which is present as a residual catalyst, if any, is that plus what was added in the oxypropylation step. Caustic soda, of course, could be used to replace sodium methylate. The latter was used purely as a matter of greater convenience because it is available as a finely divided powder.

It is advisable to again point out that there is no question as to the structure of styrene glycol but the higher polymers may represent a mixture of cogeneric products or isomers. Three structures have been suggested for di-styrene glycol. Needless to say, more possibilities exist for the trimer, tetramer, or pentamer. The following formulas are believed to characterize the bulk of the products employed but it is obvious that one may have other isomers or a mixture of isomers, but in any event, a dihydroxylated compound.

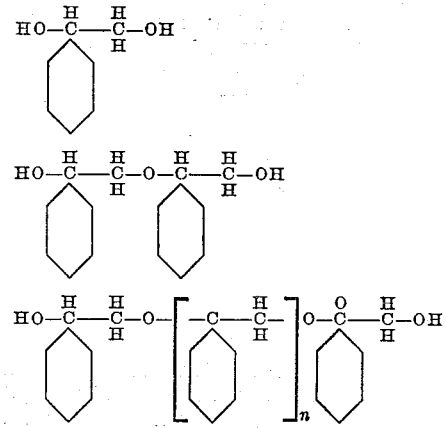

where $n$ is 1, 2, 3 or 4.

In the following examples sodium methylate was used as a catalyst. In many instances there is a question as to what extent alcoholysis takes place and sodium methylate is added to the hydroxylated reactant. In these particular examples the styrene glycol or polystyrene glycol was mixed with an amount of sodium methylate as indicated and also with 500 grams of xylene. The mixture was placed in the resin type flask or equivalent as previously described and heated at the reflux point for two hours and then approximately 100 cc. of xylene was allowed to distill over and was caught in the trap. This xylene was discarded and replaced by an equal amount of xylene. If alcoholysis has taken place methyl alcohol would be present in the initial xylene distillate and presumably was removed.

Oxypropylation was conducted then in the usual manner, first sweeping out the equipment with nitrogen, setting the automatic controls and adding the propylene oxide in such manner that it was injected into the reaction vessel in 10 to 15 hours, provided there was no interruption due to excess temperature, pressure, etc. A specific example is included by way of illustration.

*Example 1a*

414 grams of monomeric styrene glycol were mixed with 12 grams of sodium methylate and 500 grams of xylene. The mixture was refluxed in the manner previously described and then placed in the autoclave and the pot completely flushed out with nitrogen. The autoclave was sealed, the automatic devices adjusted, and set for injecting a total of 1914 grams of propylene oxide in a 12-hour period (approximately 150 grams per hour).

In some experiments the predetermined rate was as low as 100 grams per hour and as much as 300 grams per hour. The autoclaves used were identical except as to size, one being slightly less than one gallon in capacity and the other approximately 1¾ gallons.

During this particular experiment the temperature range varied from 115° to 125° C. The pressure varied from 30 to 40 pounds per square inch. This temperature and pressure range, incidentally, was used in all this series. The time required was 24 hours. This means that the experiment was started one day and was complete the next day. Actually, all addition of the oxide was probably complete in about 10 to 12 hours but for convenience anything less than 24 hours is still recorded as 24 hours.

The final product was a somewhat viscous amber-colored fluid which was water-insoluble. It was characteristic of all the various end products obtained in this series. It was, of course, slightly alkaline due to the residual sodium methylate reaction product. A complete series is illustrated, with all pertinent data, in the following table. The molecular weight of the final product is based on the assumption that if reaction is complete, and all evidence seems to point to this fact, and, of course, in light of what is said subsequently must represent a statistical average rather than a single glycol.

| Ex. No. | Styrene Glycol | Probable Molecular (Wt.) | Amt. (grs.) | Xylene Added if any (grs.) | Sod. Methylate (grs.) | Propylene Oxide added (grs.) | Molal Ratio | Time (hrs.) | Max. and Min. Temp. °C. | Max. and Min. Pres. p. s. i. | Molecular Wt. Final Prod. |
|---|---|---|---|---|---|---|---|---|---|---|---|
| 1a | Monomer | 138 | 414 | 500 | 12.0 | 1,914 | 11:1 | 24 | 115–125 | 30–40 | 776 |
| 2a | do | 138 | 207 | 500 | 12.0 | 2,205 | 25:1 | 24 | 115–125 | 30–40 | 1,608 |
| 3a | do | 138 | 138 | 500 | 11.0 | 1,914 | 33:1 | 24 | 115–125 | 30–40 | 2,052 |
| 4a | do | 138 | 110 | 500 | 12.5 | 2,430 | 42:1 | 48 | 115–125 | 30–40 | 2,568 |
| 5a | Dimer | 258 | 774 | 500 | 13.5 | 1,944 | 11:1 | 24 | 115–125 | 30–40 | 896 |
| 6a | do | 258 | 387 | 500 | 11.5 | 1,914 | 25:1 | 24 | 115–125 | 30–40 | 1,728 |
| 7a | do | 258 | 258 | 500 | 12.0 | 2,205 | 33:1 | 48 | 115–125 | 30–40 | 2,172 |
| 8a | do | 258 | 206 | 500 | 11.5 | 1,944 | 42:1 | 24 | 115–125 | 30–40 | 2,688 |
| 9a | Trimer | 378 | 1134 | 500 | 11.5 | 1,914 | 11:1 | 24 | 115–125 | 30–40 | 1,016 |
| 10a | do | 378 | 568 | 500 | 10.0 | 2,205 | 25:1 | 48 | 115–125 | 30–40 | 1,948 |
| 11a | do | 378 | 378 | 500 | 11.0 | 1,914 | 33:1 | 24 | 115–125 | 30–40 | 2,292 |
| 12a | do | 378 | 302 | 500 | 11.0 | 1,944 | 42:1 | 24 | 115–125 | 30–40 | 2,808 |
| 13a | Tetramer | 498 | 1494 | 500 | 16.0 | 1,914 | 11:1 | 24 | 115–125 | 30–40 | 1,136 |
| 14a | do | 498 | 749 | 500 | 15.0 | 2,205 | 25:1 | 48 | 115–125 | 30–40 | 2,068 |
| 15a | do | 498 | 498 | 500 | 11.0 | 1,914 | 33:1 | 24 | 115–125 | 30–40 | 2,412 |
| 16a | do | 498 | 398 | 500 | 11.5 | 1,944 | 42:1 | 24 | 115–125 | 30–40 | 2,928 |
| 17a | Pentamer | 618 | 1854 | 500 | 19.0 | 1,914 | 11:1 | 24 | 115–125 | 30–40 | 1,256 |
| 18a | do | 618 | 927 | 500 | 16.0 | 2,205 | 25:1 | 48 | 115–125 | 30–40 | 2,188 |
| 19a | do | 618 | 618 | 500 | 12.5 | 1,914 | 33:1 | 24 | 115–125 | 30–40 | 2,532 |
| 20a | do | 618 | 494 | 500 | 12.0 | 1,944 | 42:1 | 24 | 115–125 | 30–40 | 3,048 |
| 21a | Hexamer | 738 | 2214 | 500 | 20.0 | 1,914 | 11:1 | 24 | 115–125 | 30–40 | 1,376 |
| 22a | do | 738 | 1107 | 500 | 16.0 | 2,205 | 25:1 | 48 | 115–125 | 30–40 | 2,308 |
| 23a | do | 738 | 738 | 500 | 13.5 | 1,914 | 33:1 | 24 | 115–125 | 30–40 | 2,652 |
| 24a | do | 738 | 590 | 500 | 12.5 | 1,944 | 42:1 | 24 | 115–125 | 30–40 | 3,168 |

Previous reference has been made to the fact that the end products are in essence cogeneric mixtures which represent the ratios indicated on an average or a statistical basis. This applies both in the higher stages of oxy(phenyl)ethylation and in substantially all the stages of oxypropylation. Reference is made to the previous examples wherein it is obvious that the divalent radical $-(C_3H_6O)_n-$ appears. One example is

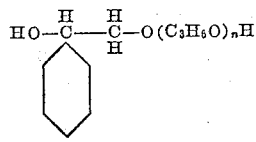

For purpose of illustration no effort was made to consider whether or not oxypropylation of the secondary alcohol radical takes place at the same time. Actually when such products are obtained in the manner herein described one does not obtain a single derivative in which $n$ has one and only one value, for instance, 14 or 15 or 16, or the like. Thus, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes, one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulaes of a large number of compounds which appear in some of the probable mixtures or can be prepared as components and mixtures which are manufactured conventionally.

Simply by way of illustration reference is made to the co-pending application of De Groote, Wirtel, and Pettingill, Serial No. 109,791, filed August 11, 1949, now Patent No. 2,549,434.

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent which, for the sake of convenience, may be indicated as $RO(C_2H_4O)_{30}OH$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$ in formulaes such as

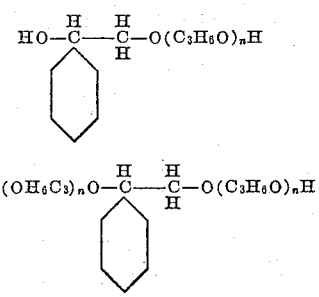

as representing both individual constituents in which $n$ has a single definite value, and also with the understanding that $n$ represents the average statistical value based on the assumption of completeness of reaction.

This may be illustrated as follows: Assume that in any particular example the molal ratio of the propylene oxide to the diol is 15 to 1. Actually, one obtains products in which $n$ probably varies from 10 to 20, perhaps even further. The average value, however, is 15, assuming, as previously stated, that the reaction is complete. The product described by the formula may be described also in terms of method of manufacture but insofar that a single hydroxyl only is involved as differentiated from materials obtained by oxypropylation of polyhydric reactants it appears more satisfactory to employ the customary formula type description as long as the obvious limitations are completely understood.

Reviewing then the oxypropylation products described it will be noted that they come within the molecular weight range of about 750 to 3500. They represent a molal ratio of propylene oxide to hydroxylated reactant varying from 10 to 1, through the range of 50 to 1. The products are invariably water-insoluble notwithstanding the fact that styrene glycol is water-soluble and the lower propylene glycols are water-soluble. In substantially every instance the products are also soluble in kerosene. My preferred molecular range of reactants is between 1,000 and 2,500.

PART 3

As previously pointed out the present invention is concerned with acidic esters obtained from the propylated derivatives described in Part 2, immediately preceding, and polycarboxy acids, particularly dicarboxy acids such as adipic acid, phthalic acid or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contains as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydride or any other obvious equivalents.

The production of esters including acid esters (fractional esters) from polycarboxy acids and glycols is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind previously described and particularly with one more opening to permit the use of a porous spreader if hydrochloric acid gas is to be used as a catalyst. Such device or absorption spreaders consist of minute Alundum thimbles which are connected to a glass tube. One can add a sulfonic acid such as para-toluene sulfonic acid as a catalyst. There is some objection to this because in some instances there is some evidence that this acid catalyst tends to decompose or rearrange heat oxypropylated compounds and particularly likely to do so, if the esterification temperature is high. In the case of polycarboxy acids, such as diglycollic acid, which is strongly acidic there is no need to add any catalyst. The use of hydrochloric gas has one advantage over para-toluene sulfonic acid and that is, that at the end of the reaction it can be removed by flushing out with nitrogen, whereas there is no reasonably convenient means available of removing the para-toluene sulfonic acid or other sulfonic acid employed. If hydrochloric acid is employed one need only to pass the gas through at an exceedingly slow rate so as to keep the reaction mass acidic. Only a trace of acid need be present. I have employed hydrochloric acid gas or the aqueous acid itself to eliminate the initial basic material.

The products obtained in Part 2 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivative described in Part 2 is then diluted further with sufficient xylene so that one has obtained approximately a 65% solution. To this solution there is added a polycarboxylated reactant as previously described., such as phthalic anhydride, succinic acid, or anhydride, diglycollic acid, etc. The mixture is refluxed until esterification is complete as indicated by elimination of water or drop in carboxyl value or drop in hydroxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

It is to be pointed out that the products here described are not polyesters in the sense that there is a plurality of both diol radicals and acid radicals; the product is characterized by having only one diol radical.

Example 33b (The "b" series examples, 1b, 2b, 3b, etc., are described in the subsequent table. Purely as a matter of convenience Ex. 33b is selected to serve as an illustration.)

A xylene solution of oxypropylated product Example 3a, equivalent to 513 grams of the material, was employed as a hydroxylated compound. To this there were added 67 grams of diglycollic acid. Sufficient xylene was added so the total amount of xylene present was approximately 250 grams. The materials were placed in a glass resin pot of the kind previously described except that the pot had four top openings instead of three; one for the condenser, one for the thermometer, one for the stirring device, and one for a diffuser tube for hydrochloric acid gas. Since diglycollic acid is a fairly strong acid, esterifications can be conducted at 150° C., or higher, for instance, 200° C., without the use of an added catalyst. However, in this instance a trace of hydrochloric acid gas was used. In other words, during the esterification procedure just a mere trifle of gas was permitted to pass through the mixture so there was always at least a trace or more of hydrochloric acid present. The amount of diol employed was approximately ¼ mole. The amount of diglycollic acid employed was approximately ½ mole, the ratio being two to one. The amount of water evolved was somewhat less than 10 grams. In all instances the reaction was stopped when the amount of water out was equal to theoretical or when an analysis of reaction mass showed that the hydroxyl value or acid value (generally the acid value) had dropped to a comparatively low figure indicating at least 85% to 95% of esterification. Needless to say, if too much hydrochloric acid gas is used, and assuming the gas is dry, it will carry away water of reaction thus giving a low reading. Also, if the end of the reaction is to be determined by acid value, allowance must be made for any unreacted acidic catalyst which may be present. As previously pointed out para-toluene sulfonic acid can be used but it is preferable not to use it. When the reaction was complete the diffuser tube was used to permit dry nitrogen to pass through the mass to flush out any hydrochloric gas which was present. This step, of course, is unnecessary when either no catalyst is employed or para-toluene sulfonic acid is used. For that matter a small amount of hydrochloric acid can remain in the end product. The final mixture represented a solution of about two-thirds acidic ester and one-third xylene. Any other suitable solvent such as cymene, mesitylene, decalin, etc., could be used so as to permit the reflux temperature to be somewhat higher; or somewhat lower as in the use of toluene.

The amount of xylene used was sufficient to maintain the temperature of reflux at 150° C. However, any temperature from 145° to 155° C.

will serve. The weights indicated are based on a proportionate molecular weight range and actually the amounts that went into the reaction vessel may have varied slightly, for instance, a few grams more or a few grams less. However, all this was within working tolerance of a procedure of this kind. It is to be noted, also, that commercial chemicals were employed and in such instances purity may have been somewhat less than 100%.

water-soluble surface-active materials which can be used as demulsifying agents, or coupling agents in the manufacture of emulsifying agents for preparing oil-in-water emulsions. Furthermore, they can be treated with epichlorohydrin and then with pyridine to give quaternary ammonium products which are valuable for inhibiting micro-organic or bacteriological growths.

A series of examples appear in the following table illustrating the entire procedure.

| Ex. No. | Oxypropylated Compound | Amt. Used (grs.) | Polycarboxy Compound | Amt. Used (grs.) | Amt. Xylene Used (grs.) | Catalyst Used, If Any | Amt. Used | Time of Reflux (Approx. 150° C.) (hrs.) |
|---|---|---|---|---|---|---|---|---|
| 1b | 5a | 448 | Adipic Acid | 146 | 250 | HCl | Trace | 6 |
| 2b | 5a | 448 | Phthalic Anhyd | 148 | 250 | | | 4 |
| 3b | 5a | 448 | Succinic Anhyd | 100 | 250 | | | 4 |
| 4b | 5a | 448 | Sebacic Acid | 202 | 250 | HCl | Trace | 6 |
| 5b | 5a | 448 | Azelaic Acid | 188 | 250 | HCl | do | 6 |
| 6b | 7a | 543 | Adipic Acid | 73 | 250 | HCl | do | 6 |
| 7b | 7a | 543 | Phthalic Anhyd | 74 | 250 | | | 4 |
| 8b | 7a | 543 | Succinic Anhyd | 50 | 250 | | | 4 |
| 9b | 7a | 543 | Sebacic Acid | 101 | 250 | HCl | Trace | 6 |
| 10b | 7a | 543 | Azelaic Acid | 94 | 250 | HCl | do | 6 |
| 11b | 9a | 508 | Adipic Acid | 146 | 250 | HCl | do | 6 |
| 12b | 9a | 508 | Phthalic Anhyd | 148 | 250 | | | 4 |
| 13b | 9a | 508 | Succinic Anhyd | 100 | 250 | | | 4 |
| 14b | 9a | 508 | Sebacic Acid | 202 | 250 | HCl | Trace | 6 |
| 15b | 9a | 508 | Azelaic Acid | 188 | 250 | HCl | do | 6 |
| 16b | 11a | 573 | Adipic Acid | 73 | 250 | HCl | do | 6 |
| 17b | 11a | 573 | Phthalic Anhyd | 74 | 250 | | | 4 |
| 18b | 11a | 573 | Succinic Anhyd | 50 | 250 | | | 4 |
| 19b | 11a | 573 | Sebacic Acid | 101 | 250 | HCl | Trace | 6 |
| 20b | 11a | 573 | Azelaic Acid | 94 | 250 | HCl | do | 6 |
| 21b | 13a | 568 | Adipic Anhyd | 146 | 250 | HCl | do | 6 |
| 22b | 13a | 568 | Phthalic Anhyd | 148 | 259 | | | 4 |
| 23b | 13a | 568 | Succinic Anhyd | 100 | 250 | | | 4 |
| 24b | 13a | 568 | Sebacic Acid | 202 | 250 | HCl | Trace | 6 |
| 25b | 13a | 568 | Azelaic Acid | 188 | 250 | HCl | do | 6 |
| 26b | 15a | 603 | Adipic Anhyd | 73 | 250 | HCl | do | 6 |
| 27b | 15a | 603 | Phthalic Anhyd | 74 | 250 | | | 4 |
| 28b | 15a | 603 | Succinic Anhyd | 50 | 250 | | | 4 |
| 29b | 15a | 603 | Sebacic Acid | 101 | 250 | HCl | Trace | 6 |
| 30b | 15a | 603 | Azelaic Acid | 94 | 250 | HCl | do | 6 |
| 31b | 1a | 776 | Diglycollic Acid | 268 | 300 | HCl | do | 6 |
| 32b | 2a | 804 | do | 134 | 300 | HCl | do | 6 |
| 33b | 3a | 513 | do | 67 | 250 | HCl | do | 6 |
| 34b | 4a | 642 | do | 67 | 250 | HCl | do | 6 |
| 35b | 5a | 448 | do | 134 | 250 | HCl | do | 6 |
| 36b | 6a | 864 | do | 134 | 300 | HCl | do | 6 |
| 37b | 7a | 543 | do | 67 | 250 | HCl | do | 6 |
| 38b | 8a | 672 | do | 67 | 275 | HCl | do | 6 |
| 39b | 1a | 776 | Aconitic Acid | 348 | 300 | HCl | do | 6 |
| 40b | 2a | 804 | do | 174 | 300 | HCl | do | 6 |
| 41b | 3a | 513 | do | 87 | 250 | HCl | do | 6 |
| 42b | 4a | 642 | do | 87 | 275 | HCl | do | 6 |
| 43b | 5a | 448 | do | 174 | 250 | HCl | do | 6 |
| 44b | 6a | 864 | do | 174 | 300 | HCl | do | 6 |
| 45b | 7a | 543 | do | 87 | 250 | HCl | do | 6 |
| 46b | 8a | 672 | do | 87 | 250 | HCl | do | 6 |

Such solvent can be removed by the usual procedure, such as distillation and particularly vacuum distillation. It need not be removed as far as its use as a demulsifier goes.

The final product, on a solvent-free basis, was a somewhat viscous liquid with a straw color. The products varied from this color, or somewhat lighter, to products which were darker in color with a reddish-amber cast. The products were water-insoluble. Needless to say, these acid esters can be decolorized by any usual procedure such as treating with charcoal, bleaching clays, or the like. Indeed, the hydroxylated reactant prior to oxypropylation can be decolorized also in the same manner. However, there is no need to go to this added expense for use in demulsification.

It is to be noted that the use of these products is not limited to demulsification, and have utility in other applications, such as use as a break-inducer in the doctor treatment of sour hydrocarbons. Similarly, since these products contain a reactive carboxyl radical they can be converted into other derivatives which, in turn, have numerous uses. For example, these products can be subjected to oxyethylation to yield The reflux times appearing in the tables varying from 4 to 6 hours, represent approximations. In practically every instance after the reflux started the theoretical amount of water, or the equivalent indication that reaction was complete, appeared within 3 to 4½ hours. In other words, if the reflux time was actually cut down to three hours wherever 4 hours happened to be indicated, or to 4½ hours wherever 6 hours are indicated, the resultant product would probably be the same. Indeed, at higher temperatures the reaction can be completed in less time and can be completed just as rapidly in absence of any solvent by employing a temperature of approximately 200° C.

Having thus described my invention what I claim as new and desire to secure by Letters Patent, is:

1. A monomeric acidic ester; said acidic ester being obtained by reaction between (a) one mole of the dihydroxylated oxypropylation product obtained from a member of the class consisting of styrene glycols and polystyrene glycols up to and including the hexamer, and (b) 2 moles of a polycarboxy acid; said oxypropylation product prior to esterification being within the molecular weight range of 750 to 3500, and being obtained by oxypropylation in the molal ratio from 10 to 1 through the range of 50 to 1 on the basis of propylene oxide to styrene compound, and said oxypropylation product prior to esterification being water-insoluble; said acidic reactant having not more than 36 carbon atoms.

2. A monomeric acidic ester; said acidic ester being obtained by reaction between (a) one mole of the dihydroxylated oxypropylation product obtained from a member of the class consisting of styrene glycols and polystyrene glycols up to and including the hexamer, and (b) 2 moles of a dicarboxy acid; said oxypropylation product prior to esterification being within the molecular weight range of 1000 to 2500 and being obtained by oxypropylation in the molal ratio from 10 to 1 through the range of 50 to 1 on the basis of propylene oxide to styrene compound, and said oxypropylation product prior to esterification being water-insoluble; said acidic reactant having not more than 36 carbon atoms.

3. A monomeric acidic ester; said acidic ester being obtained by reaction between (a) one mole of the dihydroxylated oxypropylation product obtained from a member of the class consisting of styrene glycols and polystyrene glycols up to and including the hexamer, and (b) 2 moles of a saturated dicarboxy acid; said oxypropylation product prior to esterification being within the molecular weight range of 1000 to 2500 and being obtained by oxypropylation in the molal ratio from 10 to 1 through the range of 50 to 1 on the basis of propylene oxide to styrene compound, and said oxypropylation product prior to esterification being water-insoluble; said acidic reactant having not more than 36 carbon atoms.

4. A monomeric acidic ester; said acidic ester being obtained by reaction between (a) one mole of the dihydroxylated oxypropylation product obtained from a member of the class consisting of styrene glycols and polystyrene glycols up to and including the hexamer, and (b) 2 moles of a saturated heat-stable dicarboxy acid; said oxypropylation product prior to esterification being within the molecular weight range of 1000 to 2500 and being obtained by oxypropylation in the molal ratio from 10 to 1 through the range of 50 to 1 on the basis of propylene oxide to styrene compound, and said oxypropylation product prior to esterification being water-insoluble; said acidic reactant having not more than 36 carbon atoms.

5. The product of claim 4 with the proviso that the molecular weight range of the oxypropylation product is between 1,000 and 2,500.

6. The product of claim 4 with the proviso that the molecular weight range of the oxypropylation product is between 1,000 and 2,500, and the dicarboxy acid reactant is phthalic anhydride.

7. The product of claim 4 with the proviso that the molecular weight range of the oxypropylation product is between 1,000 and 2,500, and the dicarboxy acid reactant is succinic acid.

8. The product of claim 4 with the proviso that the molecular weight range of the oxypropylation product is between 1,000 and 2,500, and the dicarboxy acid reactant is diglycollic acid.

9. The product of claim 4 with the proviso that the molecular weight range of the oxypropylation product is between 1,000 and 2,500, and the dicarboxy acid reactant is adipic acid.

10. The process of claim 4 with the proviso that the molecular weight range of the oxypropylation product is between 1,000 and 2,500, and the dicarboxy acid reactant is sebacic acid.

MELVIN DE GROOTE.

No references cited.